(12) United States Patent
Jorg et al.

(10) Patent No.: US 11,718,005 B2
(45) Date of Patent: Aug. 8, 2023

(54) FLOW CONTROL OF AN INJECTION MOLDING SYSTEM

(71) Applicant: Incoe International, Inc., Rodermark (DE)

(72) Inventors: Anton Jorg, Bayern (DE); Scott Greb, Washington Township, MI (US); Christian Striegel, Hessen (DE)

(73) Assignee: Incoe Corporation, Auburn Hills, MI (US)

(*) Notice: Subject to any disclaimer, the term of this patent is extended or adjusted under 35 U.S.C. 154(b) by 460 days.

(21) Appl. No.: 16/444,677

(22) Filed: Jun. 18, 2019

(65) Prior Publication Data

US 2020/0398468 A1    Dec. 24, 2020

(51) Int. Cl.
*B29C 45/30* (2006.01)
*F16K 1/52* (2006.01)
*F16K 21/18* (2006.01)
*G05D 16/20* (2006.01)
*B29C 45/28* (2006.01)

(52) U.S. Cl.
CPC ............... *B29C 45/30* (2013.01); *F16K 1/52* (2013.01); *F16K 21/185* (2013.01); *G05D 16/2097* (2019.01); *B29C 2045/2824* (2013.01)

(58) Field of Classification Search
CPC ............ B29C 45/30; B29C 2045/2824; B29C 2945/76859; B29C 2945/76933; B29C 2945/76943; B29C 2945/76785; B29C 2945/76307; B29C 2945/76381; B29C 2945/76538; B29C 2945/7606; B29C 2945/76056; B29C 45/82; B29C 2045/0032; B29C 2045/2817; B29C 45/281; G05D 16/2097; F16K 1/52; F16K 21/185
See application file for complete search history.

(56) References Cited

U.S. PATENT DOCUMENTS 4,610,831 A * 9/1986 Mihara ............... B22D 17/32
                                                    264/40.7
2005/0093191 A1    5/2005 Gardener
(Continued)

FOREIGN PATENT DOCUMENTS

CN    102601949 A  *  7/2012
CN    102601949 A     7/2012
(Continued)

OTHER PUBLICATIONS

International Search Report and Written Opinion dated Oct. 14, 2020 (13 pages).
Extended European Search Report dated Mar. 18, 2020 (8 pages).

*Primary Examiner* — S. Behrooz Ghorishi
(74) *Attorney, Agent, or Firm* — Gunther Evanina; Butzel Long

(57) ABSTRACT

An actuator system for an injection molding system includes a double acting pressurized fluid actuator having a piston drive movable in a cylinder space, a flow control valve for regulating a flow rate of pressurized fluid to and/or from the cylinder space, a flow sensor for detecting the flow rate of pressurized fluid to and/or from the cylinder space, and an electronic controller for controlling the flow control valve to regulate the flow rate of pressurized fluid to and/or from the cylinder space depending on the flow rate detected by the flow sensor.

23 Claims, 5 Drawing Sheets

(56) References Cited

U.S. PATENT DOCUMENTS

| | | |
|---|---|---|
| 2010/0225025 A1 | 9/2010 | Striegel |
| 2013/0030723 A1* | 1/2013 | Gao .................... G01N 33/442 |
| | | 702/50 |
| 2015/0239162 A1 | 8/2015 | Yang et al. |
| 2017/0210048 A1 | 7/2017 | de Oliveira Antunes et al. |

FOREIGN PATENT DOCUMENTS

| | | | |
|---|---|---|---|
| EP | 2360003 A1 | 8/2011 | |
| WO | WO 2014/085321 A1 | 6/2014 | |
| WO | WO-2014085321 A1 * | 6/2014 | ........... B29C 45/281 |

* cited by examiner

FLOW CONTROL OF AN INJECTION MOLDING SYSTEM

CROSS-REFERENCE TO RELATED APPLICATIONS

Not Applicable.

FIELD OF THE DISCLOSURE

The present invention relates to a process and device for injection molding, in particular to a cascade injection molding process.

BACKGROUND OF THE DISCLOSURE

In the injection molding of flat and/or elongated parts through a single ingate (feed orifice) it is difficult to fill the cavity of the molding tool completely with melt. Furthermore, when areas of the cavity which are distant from the feed orifice are reached by the melt, its temperature is already clearly reduced, due to which inhomogeneities in the structure of the molded parts can arise.

For this reason, it is a known practice, particularly in the case of the molding of elongated and/or flat parts, to fill the cavity of the molding tool with melt through several feed orifices. In connection with this, flow lines result from the melt flow fronts issuing from the feed orifices meeting one another somewhere between neighboring feed orifices. Such flow lines represent weak points in the injected parts. Furthermore, the flow lines, depending on their material, surface, or color, may be visible on the surface of the part so that such parts must subsequently be treated by finishing.

In order to prevent such flow lines from arising, it is a known practice when using needle valve nozzles to open the different nozzles at different times. The needle valve nozzles are driven by at least one actuator system, which is in general drive by a hydraulic/pneumatic system. For example, the process begins with injection through a first nozzle and when the flow front issuing from that nozzle has reached the feed orifice of a neighboring nozzle opening that neighboring nozzle. The opening of the nozzles which are still further removed from the first nozzle is postponed in a corresponding manner. The situation is analogous to when the injection process begins through for example a central feed orifice which is encircled by several additional feed orifices, preferably lying on a circular arc around the first feed orifice. These encircling feed orifices open when the flow front from the central feed orifice has reached or passed them. Different layouts for the feed orifices are possible. This process of injection at intervals of time through several needle valve nozzles is called "cascade injection molding".

The cascade process described so far has the disadvantage that on the opening of a second nozzle, or additional nozzles, the melt is injected at the pressure predetermined by the injection molding machine and the pressure is of equal magnitude for all the nozzles. Since when the flow front of a previously opened nozzle arrives at the feed orifice of a neighboring nozzle the melt of that flow front has already suffered a cooling and a loss of pressure, undesirable flow front markings arise due to melt under full pressure appearing explosively at the nozzle which opens later. This can be avoided by the later opening nozzles not being opened suddenly but rather slowly and to reduce the initial injection pressure. Consequently, the control of additional nozzles and their synchronization is essential, to receive an acceptable result.

The documents US2010/0225025A1, US 2017/0210048A1 and US 2015/0239162 A2 disclose technologies in the field.

Thus, there is a need in the art for developing a process as well as a device which is suitable for carrying out the process, where with the process and device the explosive discharge of the melt at the temporally downstream feed orifices is prevented in a simple and economical but still satisfactory manner and to control the process precisely during the injection cycle.

SUMMARY OF THE DISCLOSURE

The problem is solved by an injection molding system and a method according to the claims.

An injection molding system comprises at least one first actuator-system. The first actuator system comprises at least one piston drive having at least two pressure line connectors to drive a piston to open or close a molding nozzle. In case the piston is extended the molding nozzle is closed. In case the piston is retracted the molding nozzle is open. Inverse operation is also possible.

In a possible embodiment the nozzles are needle valve nozzles. In a cascading molding system several of the actuator-systems are arranged, which can be opened and closed at different times during the process.

The actuator system is connectable to a changeover valve having a pressure line connector and tank line connector and at least two change over pressure line connectors are provided. The first change over pressure line connector is connected to a first pressure line and the second change over pressure line connector is connected to a second pressure line, wherein the second pressure line is connected to the connector of the piston drive. The changeover valve establishes the connection to the general pressure fluid system and controls the pressure flow to and from the actuator system and the direction of the flow of the pressurized fluid. The fluid can be a hydraulic fluid or air. In the following the all components can be applied to hydraulic fluid or air. The changeover valve can be a magnetic valve, a servo valve or a proportional valve so that the flow of pressure can be controlled continuously. The control of the changeover valve can be electronically.

Furthermore an electronically adjustable flow control valve is provided having a first pressure line connector and a second pressure line connector, wherein the first pressure line connector of the adjustable flow control valve is connected to the first pressure line to establish a connection to the first pressure line connector of the changeover valve. Furthermore the second pressure line connector is connected to a third pressure line which establishes a connection to the second connector of the piston drive. The adjustable flow control valve is used for regulating the timing of the opening and/or closing of at least one nozzle according to a predetermined time delay, and to prevent explosive discharge of the fluid into the mold cavity upon opening of at least one of the nozzles. The flow control valve can be a servo valve or a proportional valve.

A further component of the invention is at least one electronic sensor for detecting the flow (P1, P2, P3) sensing the flow rate in the first, second and/or third pressure lines (L1, L2, L3). The flow sensor can determine the amount of fluid passed the sensor and preferably also the flow direction.

The flow sensor can use different technologies, mechanical meters, pressure based meters, Variable-area flow meters, Optical flow meters, Thermal mass flow meters, Vortex flow meters, Sonar flow measurement Electromagnetic, ultrasonic and Coriolis flow meters, Laser Doppler flow measure meter, Obstruction type (differential pressure or variable area), Inferential (turbine type), Electromagnetic, Positive-displacement flow meters, which accumulate a fixed volume of fluid and then count the number of times the volume is filled to measure flow, Fluid dynamic (vortex shedding), Anemometer, etc. This list is not limited. Also the interface to the sensor can be digital or analog. The sensor can provide impulse values or flowrate values on a higher information level providing different registers which can be accessed by the controller.

A further part of the invention is a controller connected to the adjustable flow control valve and to the at least one sensor, configured to electronically adjust the flow control valve, depending on information of the at least one sensor, controlling thereby the timing and the speed of the movement of the piston and the molding nozzle. The flow control valve can be configured in normally open or normally closed. That means without applying any electrical power the flow control valve is open or vice versa. In the following, the normally open configuration is discussed but the invention is not limited to this configuration. In a possible embodiment, the controller comprises a programmable computer, also a PLC (programmable logic controller) can be used. The PLC might have a user interface or a connector which allows a reprogramming of the controller. Especially the thresholds of the sensors and the timing of the opening and closing of the adjustable flow control valve can be programmed. Also, the controller can be programmed to determine the beginning and the end of an injection phase of the injection cycle. Based on the information of the status of the injection cycle, the sensor information the level of the closing and opening can be defined. By the level of opening and/or closing, the flow of the fluid can be controlled. Also, the speed of the change between two levels can be programmed by the controller, which has a direct impact on the speed of the opening and the closing of the needle.

In a possible embodiment, the controller can run independently from the controller of the machine in which the invention is integrated. The operation of the controller can be based only on the sensor information and in some configurations also a timer. In a possible embodiment also external information can be provided to input connectors of the controller especially which respect to the status of the changeover valves but it is not necessary to enable the invention.

It has to be noted that the concept of the flow control valve can be used for the opening of needle and/or the closing of the needle and the corresponding operation of the piston. In a possible embodiment there are two flow control valves that are operated independently respectively connected to both pressure lines from and to the piston.

In a possible embodiment a check valve is connected in parallel to the adjustable flow control valve, providing a by-pass, when extending the piston of the piston drive, so that the control is only provided when opening the nozzle. The control is defined by a slower pressure reduction and/or timed pressure increase and/or a delay in the pressure reduction or release having an impact on the needle position at a certain time.

A further component of the invention is a at least one flow sensor sensing the flow in the first, second and/or third pressure line, usable of controlling an operation of the injection molding system.

Furthermore status conditions of components of the injection molding system can be derived, especially of the piston drive, the changeover valve, the adjustable flow control valve, and/or the check valve by additional sensors and/or connectors, which can be used for the programming. Especially it can be determined if one of the components is not working or not working within in certain time range, due to wear.

Also, the position of the piston of the piston drive and/or the adjustment of the adjustable flow control valve can be determined by the measurement of the flow rate change over a certain time, and preferably indicated. Based information of the size of pressure chambers of the and the flow rate measured over a certain time, the amount of fluid which is in the piston can be calculate and thus the position of the needle can be determined. Also, it is possible to control the adjustable flow control valve to change the speed of the opening and/or closing of the needle at certain positions and/or times.

The flow sensor can be used to determine deviations in the viscosity of the pressure fluid. These deviations lead to non-reproducible results in the manufacture of injection molded products. If the fluid flowability in the pressure lines increases due to heat, the needles may be closed/opened more quickly. This leads to deviations in the quality of the injection molded products. However the flow control valves can be adjusted in the event of deviations of the viscosity of the pressure fluid from a defined standard, to improve the quality of the molded products. It is also possible to use one sensor to adjust several flow control valves being used in different locations of the mold, especially in case of a cascading mold process. In case the viscosity is too high the flow control valves are adjusted to reduce the throttling and vice versa.

In a possible embodiment a first flow sensor is adapted to measure the flow rate in the first pressure line between the adjustable flow control valve and the changeover valve. In case a certain maximum flow amount is exceeded information about a leak can be displayed. If the time for increasing the flow amount to the maximum flow amount in the first line deviates from preset gradients a problem with respect to the piston drive or check valve can be displayed. In combination with other sensors (for example pressure sensors) which will be discussed below the problems can be limited to certain components.

In a possible embodiment a second flow sensor is adapted to measure the flow rate (flow amount) in the second pressure line L2 between the piston drive and the changeover valve. Also, for this sensor the same applies as for the first sensor.

In a possible further embodiment a third flow sensor is adapted to measure the flow rate in the third pressure line between the piston drive and the adjustable flow control valve. Also for this sensor the same applies as for the other sensors. Especially this sensor can be used to control the adjustable flow control valve, by adjusting the flow.

Additional to the flow sensor a first pressure control sensor can be adapted to measure the pressure in the first pressure line between the adjustable flow control valve and the changeover valve; or a second pressure sensor is adapted to measure the pressure in the second pressure line between the piston drive and the changeover valve; or a third pressure sensor is adapted to measure the pressure in the third pressure line between the piston drive and the adjustable flow control valve.

These pressure sensors measure the pressure in the lines in contrast to the flow sensors measuring the amount of fluid passed in a certain time period and preferably the direction of the flow.

A molding cycle comprises several phases, in general the cycle comprises an injection phase in which the needle is opened, which is initialized by triggering the changeover valve. After the pressure phase the changeover valve is triggered again to close the needle by changing the direction of the oil flow (There are also processes with several injections). A cooling phase, an opening phase in which the mold is opened, an ejection phase in which the product produced is ejected from the mold and a closing phase in which the mold is closed are sequentially executed. Then the cycle starts again.

The controller is configured to determine a beginning and/or an end of injection phase of a molding cycle based on information of the at least one sensor, and to adjust the flow control valve, in an initial and/or final cycle position. This determination can be performed without additional information of the controller of the injection molding machine. The controller of the invention can work independently without any status input from external sources. In a possible embodiment additional information can be provided from external sources but they are not necessary to control the flow control valve.

The controller is configured to determine the end of the injection phase of the molding cycle if the information from the at least one sensor indicate that the piston is in a position in which the molding nozzle is closed, preferably for a predefined timespan, by determining the fluid flow amount and/or direction. Especially after the end of the pressure phase the changeover valve or in case of a cascade system all change over valves are closed, to start the cooling phase. The cooling phase is normally a longer timespan so that in a possible embodiment also a timer is used to determine the end of the injection phase. If the timer has counted a predefined timespan in which the sensors indicate that the molding nozzle is closed the controller assumes that the injection phase has been terminated. Additionally, when the sensors indicate that the molding nozzle is opened again (after a certain timespan) it is assumed that the injection cycle starts. When using a flow sensor for example it can be determined that when the flow meter information indicate that the flow amount is above a certain level that the molding nozzle is closed and when the information indicating that the flow amount is below a certain level that the nozzle is open. Depending on the location of the sensor it can be vice versa.

On the basis of the information of the start and the end of the injection phase and thus the cycle, the controller is configured to dynamically adjust the flow control valve during the injection phase. After determining the beginning of the injection phase the controller can control the position and the speed of the change of the position of the piston and thus the position of the molding nozzle. This controlling can be performed based on timers and/or based on sensor information, wherein preferably also information of at least one timer are used together with a fluid volume and the direction of the flow of the fluid to determine the point of time and the speed of the dynamical adjustment of the flow control valve.

To individually configure the controller, the controller is configured to allow an interactive programming of the dynamical adjustment of the flow control valve, by using an interactive user interface or by providing any other interface which allows a configuration or programming of the controller based on timer and/or pressure values and/or flow signals.

In a possible embodiment the invention additionally comprises a second actuator system, which in comparison to the above-mentioned actuator does not comprise a flow control valve but only the sensor. Consequently, the second actuator system comprises, a piston drive having at least two pressure line connectors to drive a piston to open or close a molding nozzle, pressure lines connectable to a changeover valve having a pressure line connector and tank line connector and at least two change over pressure line connectors, wherein the first change over valve pressure line connector is connectable to a first pressure line and the second change over valve pressure line connector is connectable to a second pressure line, wherein the second pressure line is connected to the connector of the piston drive, and wherein the first pressure line is connected to the second connector of the piston drive, at least one electronic sensor for detecting the flow in one of the pressure lines, the controller, which is the same as used above, is connected additionally to the sensor of the second actuator system and allows to control the electronically adjustable flow control valve of the first actuator system based on information of the sensor of the second actuator system.

It is also possible that in systems with several actuator systems a single flow sensor is used, to drive all flow control valves. This can be useful in case the viscosity of the pressure fluid changes over the time to compensate deviations of the viscosity. Other applications with respect to the timing of the cycle can also be driven by only one single sensor in the system. Both approaches can be used in cascade systems.

For example in a cascade system the second actuator system can be the first actuator system that opens its nozzle first in a cycle.

The cascade system can also comprise several first actuator systems, and the sensors and the flow control valves are connected to the controller, which is configured to control one or more of the flow control valves based on one or more of the information of the sensors. That means one single controller can control the flow control valves based on different sensors. Thereby the flow control valves of one actuator system is also controlled by the information of the at least one the sensors of a different actuator system and possibly by a timer.

Based on information from the at least one sensor, that a threshold (amount of fluid) has been passed (one direction or the other), the adjustable flow control valve is opened or closed to a predefined flow level by the controller. That means depending from the fluid amount detected the flow control valve is closed for example to 70% or opened 30%, which means that 30% of the fluid can pass in a defined time span. Other levels are also possible. For example, when determining the end of a cycle this value can be preset for the valve. During the injection phase the level can be changed in a range between 100% and 0% with different speeds. The level of the opening and the speed of the opening have an impact on the opening of the needle. Depending on the type of the flow control valve different characteristic curves are programmed in the controller, which allow to determine the opening depending on the current/voltage applied by the controller.

In a possible embodiment the controller is configured to calculate based on the information of the a least one flow sensor the position of the piston of the piston drive, possibly based on the information of the flow sensor over a defined time interval. Also, the voltage and/or the characteristic curves of the flow control valve can be used for the calculation. This characteristic curve defines the opening level at a certain voltage. Also, characteristic curves defining providing information of the amount of fluid passed in a certain time at certain level under a certain predefined pressure can be used.

In a possible embodiment a check valve is connected in parallel to the adjustable flow control valve, providing a by-pass, when closing the needle and thereby moving the piston of the piston drive.

In the configuration with two flow control valves as mentioned above it is possible that also two check valves are used to avoid that one flow control valves interferes with the second control valve when operating. In case the flow is controlled by one flow control valve the other flow control valve is closed and the check valve is active and vice versa.

With the help of the flow sensors a better control of the adjustable flow control valves can be achieved. Due to the actual measured flow amount in the pressure lines the status of the actuator system can be determined with a higher accuracy and the timing and the timing preciseness of the control of the adjustable flow control valve and thus the needle during the injection phase or other actuator systems can be improved.

Especially in cascaded actuator systems, the controller will control at least some of the actuator systems on the basis of timer and one or more sensors of a different actuator system. Additional sensors might be possible. For example, a sensor that measures the pressure of fluid in the pressure lines. The pressure of fluid provides additional information about the position of the piston. Also the speed of the passing fluid provides information which can be used to control the components. So it would be an option to add or use at least one pressure sensor that measures the pressure of fluid in the lines. From the pressure in combination with the information about the flow rate additional information about the flow direction and/or the viscosity can be derived.

The flow gradients over time provide information about the position of the piston especially the gradient of the first flow sensor and/or the gradient of the third flow sensor provide the necessary information in a certain time interval.

In case of an error or time overrun the controller is configured to bring the adjustable flow valve into its initial position when starting a cycle.

Another aspect of the invention is a method for controlling an actuator of an injection molding system, the actuator having at least one piston drive comprising a piston to open or close a molding nozzle. An electronically adjustable flow control valve is used to have on impact on the movements of the piston drive by throttling a pressure fluid driving the piston drive. At least one electronic sensor for detecting the flow amount of the pressure fluid is connected to a controller to adjust the adjustable flow control valve, the method comprises the steps of: determining based on information from the sensor the begin of an injection molding cycle, controlling the throttle of the adjustable flow control valve during the injection molding cycle by the controller thereby controlling the position, the speed and the timing of the movement of the piston and thus the molding nozzle.

The above and further advantages of the invention may be better understood by referring to the following description in conjunction with the accompanying drawings.

DETAILED DESCRIPTION

Figure 1:
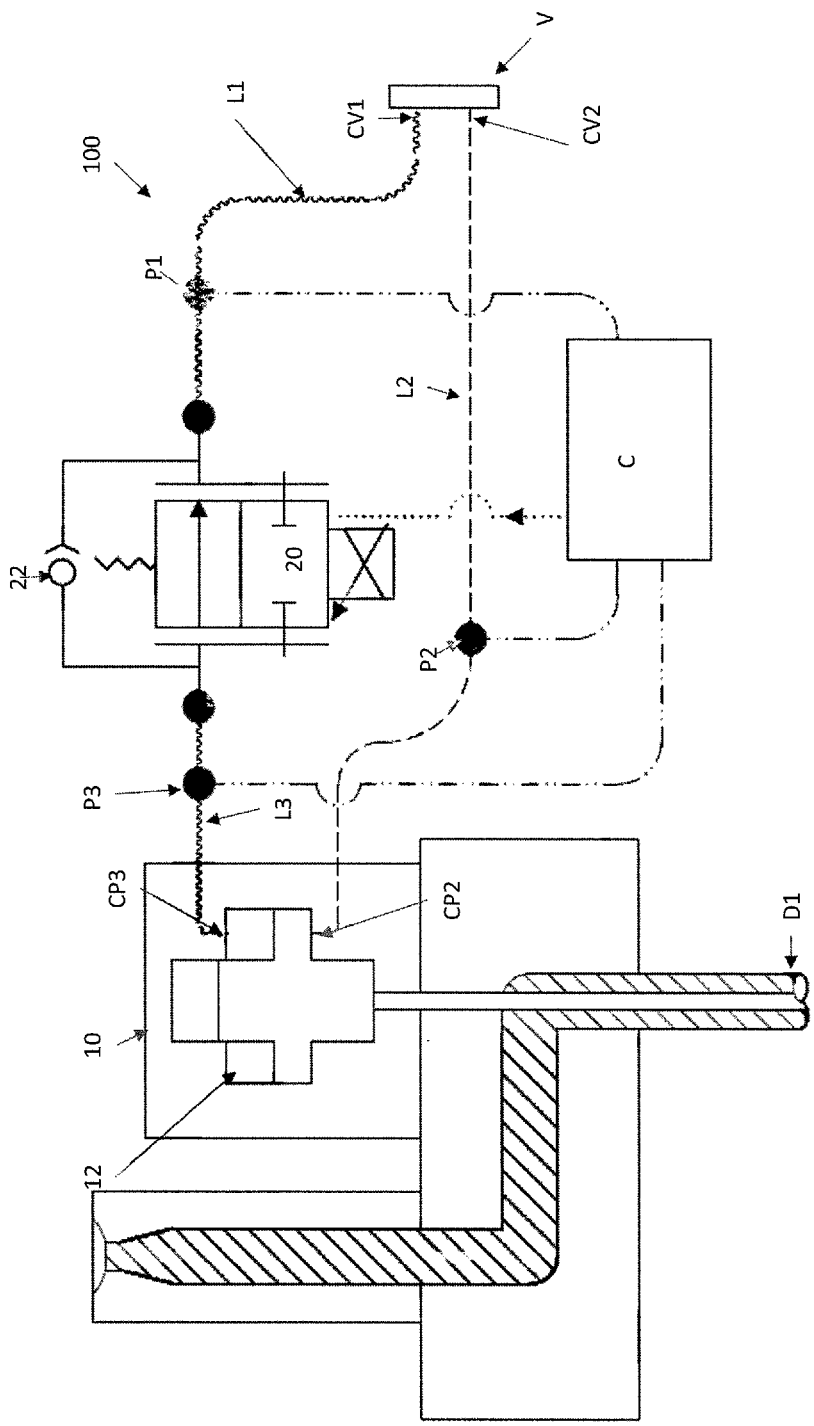
FIG. 1 shows an actuator system, comprising, a piston drive, changeover valve, adjustable flow control valve and several flow sensors in the pressure lines.

FIG. 1 shows an actuator system 100 comprising an electrically controllable flow control valve 20 which is introduced between the pressure line L1 and L3, which is connected to the cylinder space 12 of the piston drive 10 via which a nozzle is closed when pressurizing medium is fed to the cylinder space 12. The flow control valve 20 consists of an adjustable throttle valve and, lying parallel thereto, a check valve 22 whose direction of passage is toward the piston-cylinder drive 10. Wherein an embodiment without the check valve is possible. The controllable flow control valve prevents a sudden flow of the pressurizing medium out and/or in of the cylinder space 12, and thus a sudden opening and/or closing of the temporally downstream nozzle and thus the explosive injection of the melt 13 into the cavity, so that no flow front markings on the injected object result. In this embodiment a check valve 22 is disclosed, which can be integrated, and is consequently optional. In the shown configuration, the closing of the needle valve nozzle is done faster without control via the check valve 22 lying parallel to the throttle 21.

For the exchange of pressurizing medium from the cylinder space 12, the flow control valve 20 can be used to open or close each nozzle with certain speed, level and/or a time delay.

The at least one piston drive 10 has two connectors CP2, CP3 through which pressure passes to drive the piston to open or close the molding nozzle. The changeover valve V has a pressure line connector (not shown) and tank line connector (not shown) and two changeover pressure line connectors CV1 and CV2, wherein the first changeover pressure line connector CV1 is connected to a first pressure line L1 and the second changeover pressure line connector CV2 is connected to a second pressure line L2. The second pressure line L2 is connected to the connector CP2 of the piston drive 10. In a first position, a connection of CV1 with the pressure line is established and CV2 is connected to the tank line, wherein after switching of the changeover valve, CV1 is connected to the tank line CV2 is connect to the pressure line. The adjustable flow control valve 20 has a first pressure line connector and a second pressure line connector. The first pressure line connector of the adjustable flow control valve being connected to the first pressure line L1 to establish a connection to a first pressure line connector CV1 of the changeover valve V. The second pressure line connector is connected to a third pressure line L3 which establishes a connection to the second connector CP3 of the piston drive 10.

The flow sensors P1, P2, P3 are sensing the flow (amount of fluid passed preferably per time) in the first, second and/or third pressure line L1, L2, L3, usable of controlling an operation of the injection molding system, by the help of the controller C. The controller controls in a possible embodiment only the adjustable flow control valve, prior to a cycle, during a cycle and/or at the end of a cycle on the basis of the information of flow sensors. In other embodiments the controller can also control other components of the machine or receive information from other components of the machine.

Figure 2:
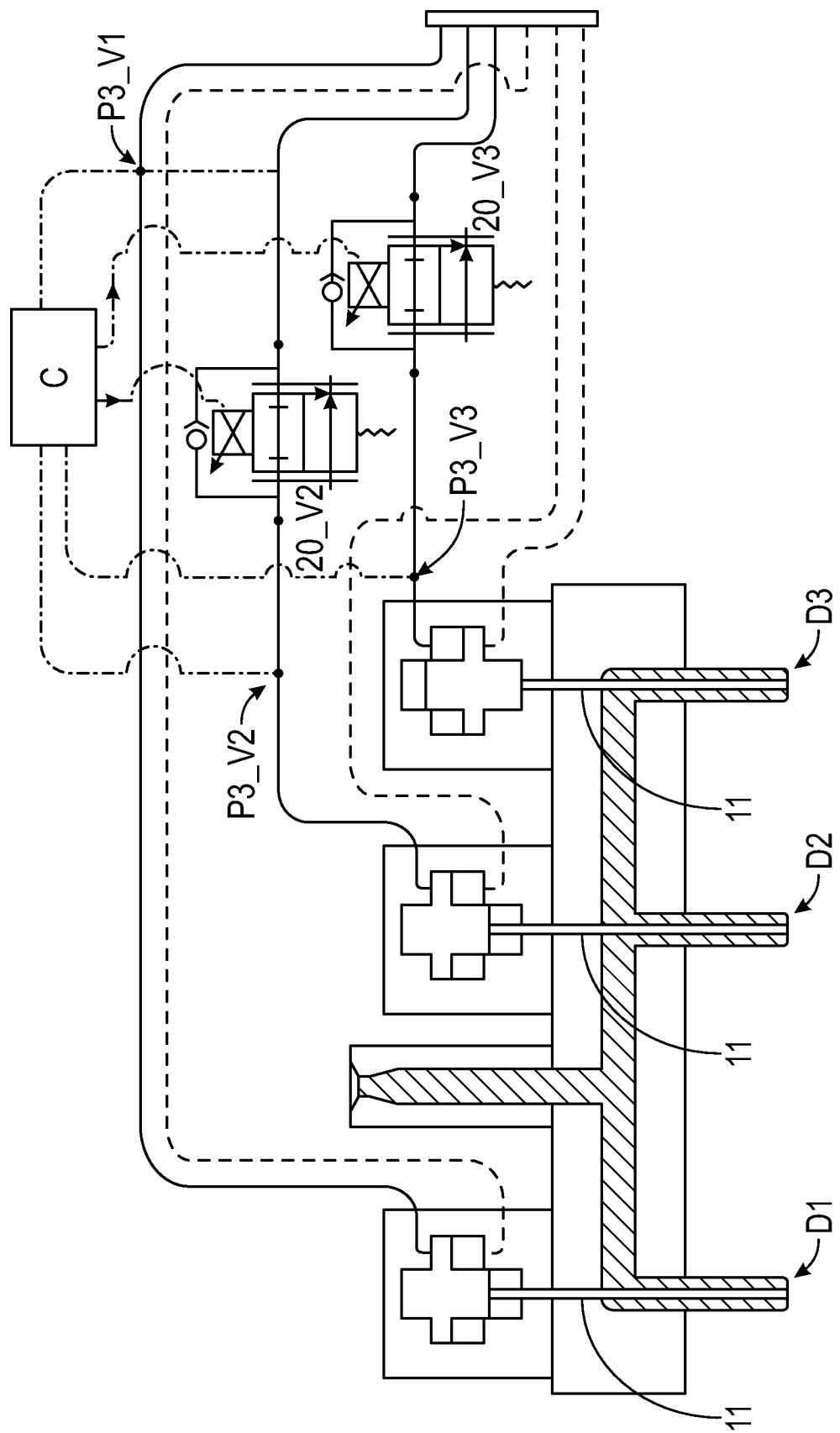
FIG. 2 shows an injection molding system comprising several actuator systems according to FIG. 1 which are controlled by a controller.

In the injection molding system according to FIG. 2, three needle valve nozzles D1 to D3 are connected to the cavity of the molding tool which is not represented in other respects. The closing and opening of the feed orifices of the nozzles is accomplished via valve rods 11, each of which is driven by its piston-cylinder drive 10. The melt is fed to the nozzles via the hot runner-distributor block (not disclosed), which is connected to the injection-molding machine, which is not shown. Each piston-cylinder drive 10 is controlled by a respective changeover valve (show as one block). The changeover valves are connected to a source of the pressurizing medium (not shown) and to a depressurized tank space (not shown).

In a cascade injection molding system using the injection molding system according to FIG. 2, the nozzle D1 opens first. When the flow front has reached or passed the feed orifice of the nozzle D2, the nozzle 2 opens and correspondingly the nozzle D3 opens when the flow front has arrived at the feed orifice of the nozzle D3.

Via time-setting elements and/or the flow sensors P3_V1 to P3_V3, the respective delay times for the opening and closing of the nozzles can be set. For example, these delay times and/or flow values may be determined empirically.

In another example, sensors at the feed orifices in the molding tool can be provided for the determination of the correct time to open the temporally downstream nozzles. Various additional types of sensors are contemplated, such as an optical sensor that operates on an optical basis or a pressure sensor that operates on the basis of pressure or a temperature sensor that operates on the temperature, by the arrival of the flow front being registered in a channel indicated in the mold's lateral ejection part, which is not represented in FIG. 1.

In the embodiment according to FIG. 2, a flow control valve 20 is absent in the pressurizing medium line for the nozzle D1 because in this example it is assumed that the nozzle D1 opens first for cascade molding (but it is also possible to introduce the adjustable flow control valve also in the first assembly). A flow control valve 20, 20_V2, 20_V3 may be provided in the pressurizing medium circuit of each nozzle since it is not known for the controller in advance through which nozzle injection will occur first. A flow control valve 20 is also of advantage when the injection molding is not a cascade injection molding, as discussed above.

In the case of pneumatically controlled needle valve nozzles, the effectiveness of the device described with the aid of FIG. 2 may be limited due to the fact that a gaseous pressurizing medium is compressible. The flow-control valve is actuated via an electromagnet and a spring, in order to adjust the intensity of the throttling can be adjusted. Moreover, such a flow-control valve has additional adjustment capabilities, which can be used by the controller C. Thus, the through-flow for the pressurizing medium can be interrupted completely by the flow-control valve.

The controller of FIG. 2 controls the adjustable flow control valves 20_V2 and/or 20_V3 on the basis of the flow sensors P3_V1, P3_V2 and/or P3_V3 in the pressure lines. The combination of timer signal and/or pressure and/or flow information allows a precise determination of the situation of the piston drive and the needle. For example the controller C can based on the information of P3_V1 determine if a cycle starts, since D1 is the first needle valve nozzles which is actuated/opened in the molding process which can be determined by a flow amount measured at P3_V1. Furthermore, if all flow sensors P3_V1 to P3_V3 indicate that D1 to D3 are closed, the injection phase is terminated. In between these two events and/or before and after the flow control valves can be adjusted to control the flow of the pressure fluid and thus the position of the needle, which again has an impact on the flow of the fluid into the mold.

Figure 3:
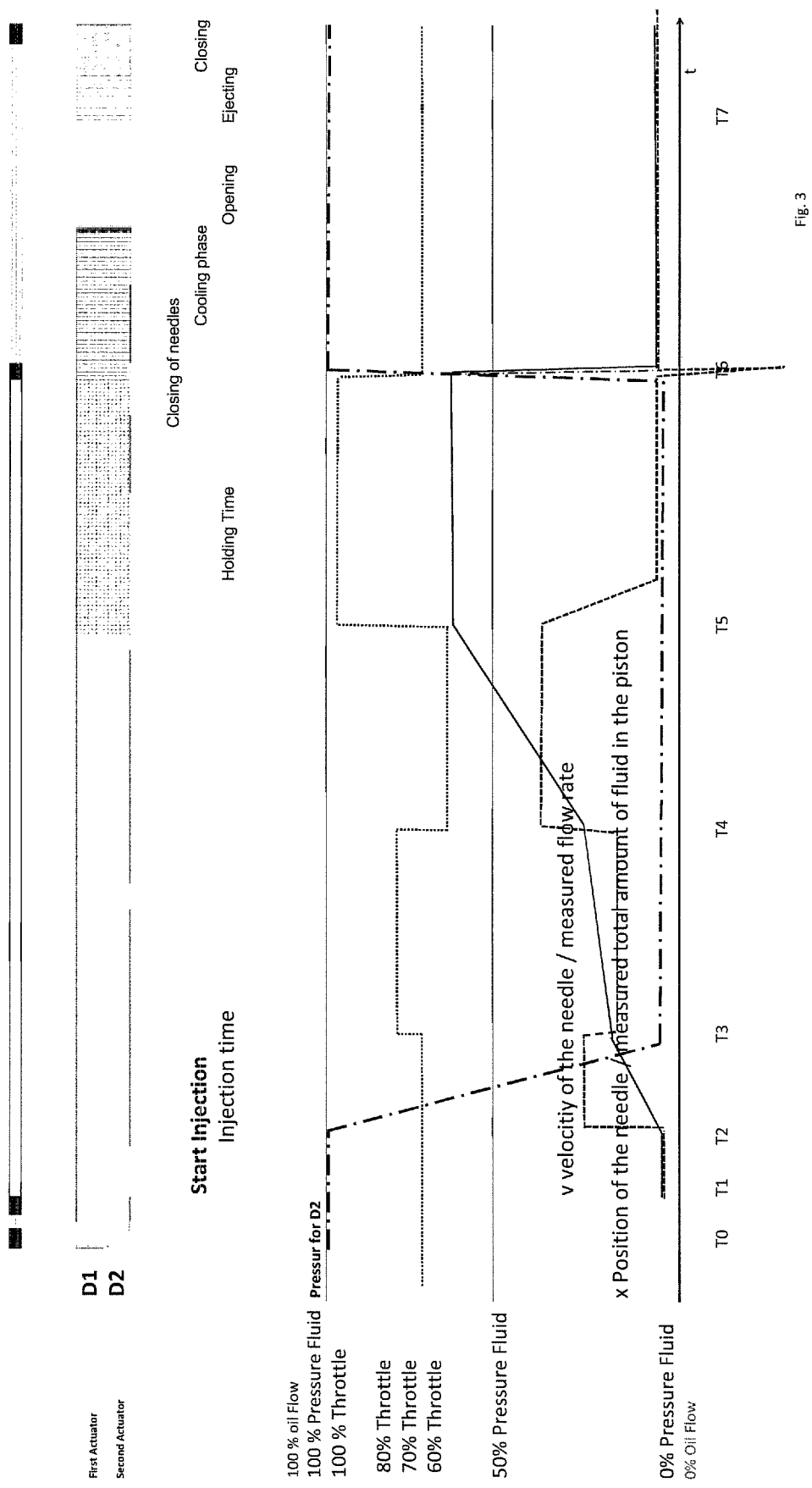
FIG. 3 shows a timing diagram of an injection molding cycle.

FIG. 3 shows a timing example of an injection molding cycle of a system with two actuators D1 and D2 driving needle valve nozzles. In this example, the second valve nozzle D2 is controlled by a flow control valve, which is described with characteristic curves. In the first two lines of FIG. 3, the injection cycle is shown at point of times T0 to T7. The injection cycle comprises several phases, comprising the starting of the cycle at T1 with the normal injection phase, the pressure injection phase, after closing all needles the cooling phase at T6, the opening phase of the mold, the ejecting phase of the product, and the closing phase of the mold is performed. Thus, the injection phase comprises two sub phases, namely the normal injection phase and the pressure injection phase. The second row shows the timing of the first actuator D1 and below of the second actuator D2. The second actuator starts its operation at T2 delayed from those of D1 at T1. The value chart below with the dot-dashed line shows the flow rate measured by sensor P3 of the second actuator. When opening the needle (switching the changeover valve) the flow rate is above zero, since the fluid flows in direction to the tank in the timespan from T1 to T6. In T6, the flow is reverse due to the closure operation of the needles. Initially, at the beginning of the cycle, the flow control valve is adjusted to 70% throttle, by the controller. The controller determines the flow change, and due to the help of a timer and or the flow change, the throttle is changed. This value is changed during the injection phase, between 60% and 100%. The dotted line indicates the changes. At T3, the throttle is changed to 80%, at T4 to 60% and at T5 to 100%. The total amount of fluid measured in one direction flowing into the cylinder corresponds to the position of the needle and is displayed by a solid line. Due to the closing operation the amount of the fluid is flowing back, which causes the value to be zero in the cylinder. The throttle has an impact on the position/speed of the needle and the velocity of the needle as it can be derived from the solid line which indicates the position of the needle. The velocity corresponds to the measured flow rate of the pressure fluid. When the flow in direction to the tank is increased, the needle starts to open at T2 with a first constant speed, in T3 the throttle is changed and the speed of opening is declined which can be derived from the dotted line. At T4, the needle speed is increased since the flow valve is opened to 60% at T5 the throttle is at 100% (closed) so that the speed is going down to 0 and the position of the needle is constant. In T6, the needle is closed again since the changeover valve is switched. The flow increase at the sensor in the opposite direction, which leads to a negative velocity.

Figure 4:
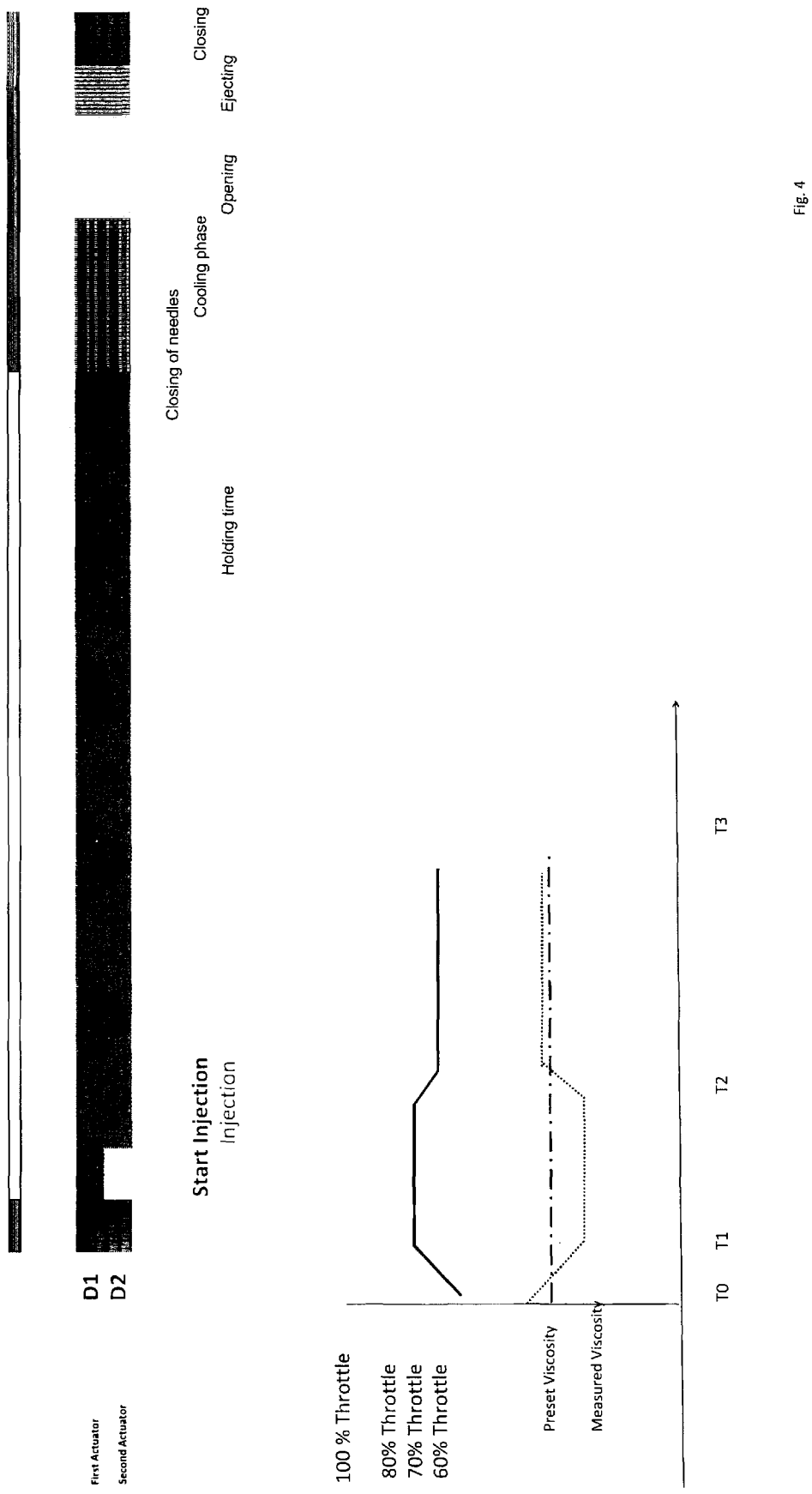
FIG. 4 shows a compensation of the viscosity by controlling the adjustable flow control valve.

FIG. 4 shows the compensation of the change in viscosity of the pressure fluid over time. A pre-set viscosity is set by the controller. Due the knowledge of the position of the fluid control valve the fluid sensor can measure the flow rate of the pressure fluid and can therefore determine if the viscosity is in the range of the pre-set value. In the period T0 to T1 the viscosity is higher than the pre-set value which leads to reduced throttle of the flow control valve, which means that more fluid can pass. During the process T1 to T2 the fluid will be heated up and the viscosity measured is decreased, thus the throttle is increased to 70%. Between T2 and T3 the viscosity is stable, having no impact on the throttle.

Figure 5:
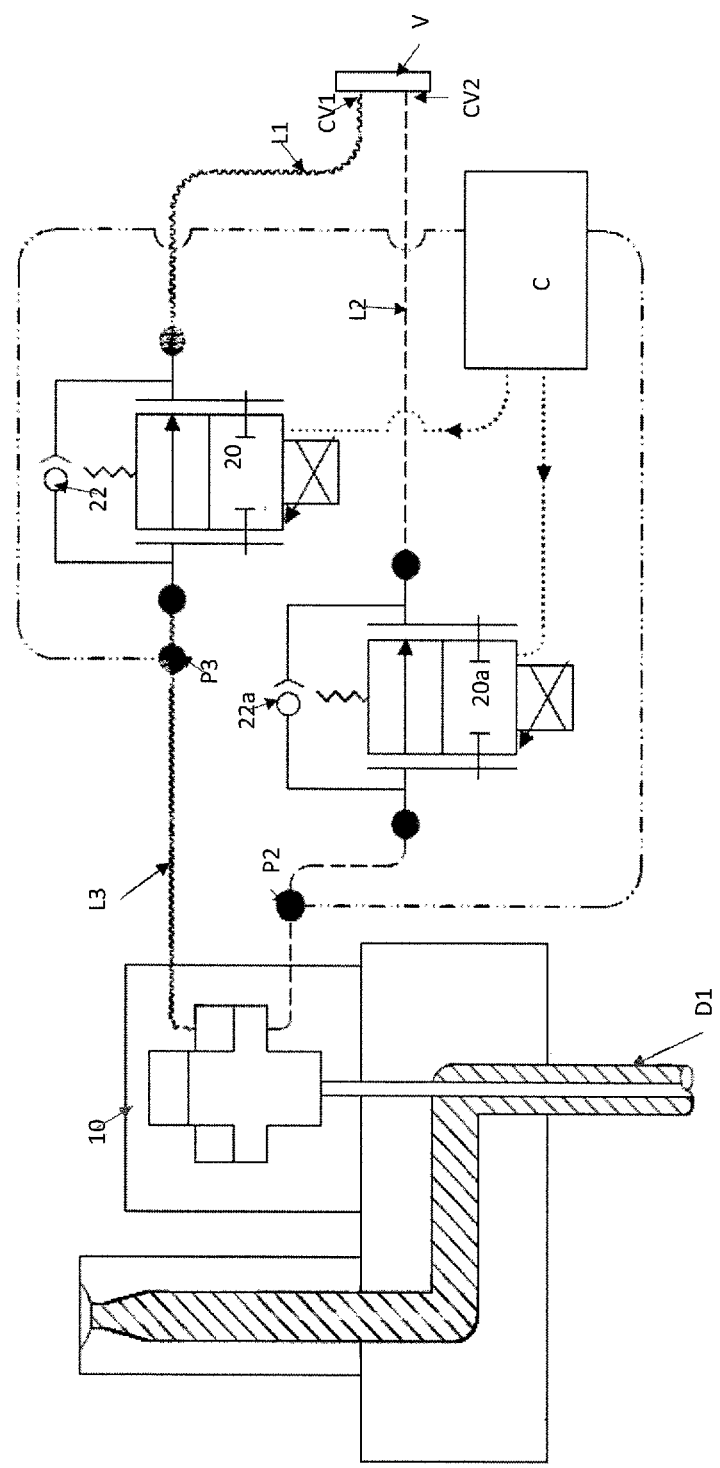
FIG. 5 shows an actuator system according FIG. 1, comprising, a piston drive, change over valve, two adjustable flow control valves and two flow sensors in the pressure lines.

FIG. 5 shows an actuator system based on the concept of FIG. 1. Additionally to the system of FIG. 1, second adjustable flow control valve 20a and a second check valve 22a are integrated in the pressure line L2, splitting the pressure line L2 in a line L2 and M. The controller C is connected to two flow sensors P2 and P3 and to the two adjustable flow control valves. This approach allows to control the flow in both directions of the piston movement, when opening or closing the needle. Also variations of the viscosity can be compensated. The two check valves have the function to allow a bypass when one of the flow control valves is closed, so that not both of the flow control valves are active at the same time.

The present invention has been described in an illustrative manner. It is to be understood that the terminology which has been used is intended to be in the nature of words of description rather than of limitation. Many modifications and variations of the present invention are possible in light of the above teachings. Therefore, the present invention may be practiced other than as specifically described.

What is claimed is:

1. An injection molding system comprising:
a first actuator system including:
a first piston drive having at least two pressure line connectors to drive a piston to open or close a molding nozzle;
first pressure lines connected to a changeover valve having at least two changeover pressure line connectors, wherein the first changeover valve pressure line connector is connected to a first pressure line and the second changeover valve pressure line connector is connected to a second pressure line, wherein the second pressure line is connected to the first pressure line connector of the first piston drive;
an electronically adjustable flow control valve having a first pressure line connector and a second pressure line connector, wherein the first pressure line connector of the adjustable flow control valve is connected to the first pressure line to allow a connection to the first pressure line connector of the changeover valve, and the second pressure line connector of the adjustable flow control valve is connected to a third pressure line which establishes a connection to the second pressure line connector of the piston drive;
a first electronic flow sensor for sensing flow rate in the first, second and/or third pressure lines;
a controller connected to the adjustable flow control valve and to the first electronic flow sensor, configured to electronically adjust the flow control valve depending on information of the first electronic flow sensor, and controlling timing and speed of the movement of the piston;
a second actuator system, including:
a second piston drive having at least two pressure line connectors to drive another piston to open or close a molding nozzle;
second pressure lines connectable to one or more changeover valves having a pressure line connector and a tank line connector and at least two changeover pressure line connectors, wherein the first changeover valve pressure line connector is connectable to a first pressure line and the second changeover valve pressure line connector is connectable to a second pressure line, wherein the second pressure line is connected to one of the two pressure line connectors of the second piston drive, and wherein the first pressure line is connected to the other one of the two pressure line connectors of the piston drive;
a second electronic flow sensor for sensing the flow rate in the first or second pressure line of the second actuator system; and
wherein the controller is connected additionally to the second electronic flow sensor of the second actuator system wherein the first and the second actuator systems are configured to be controlled in a cascade, and wherein the flow control valve is also configured to be controlled by the information of the second electronic flow sensor of the second actuator system.

2. The injection molding system according to claim 1, wherein a first electronic flow sensor is adapted to measure the flow rate in the first pressure line between the adjustable flow control valve and the first changeover valve, or wherein a second electronic flow sensor is adapted to measure the flow rate in the second pressure line between the first piston drive and the first changeover valve or wherein a third flow sensor is adapted to measure the flow in the third pressure line between the first piston drive and the adjustable flow control valve.

3. The injection molding system according to claim 1, wherein a first pressure sensor adapted to measure the pressure in the first pressure line between the adjustable flow control valve and the first changeover valve; or wherein additionally a second pressure sensor is adapted to measure the pressure in the second pressure line between the first piston drive and the first changeover valve; or wherein a third pressure sensor is adapted to measure the pressure in the third pressure line between the first piston drive and the adjustable flow control valve.

4. The injection molding system according to claim 1, wherein the controller is configured to determine a beginning and/or an end of an injection phase of a molding cycle based on information of the first electronic flow sensor, and to adjust the flow control valve, in an initial and/or final cycle position.

5. The injection molding system according to the preceding claim 4, wherein the controller is configured to determine the end of the injection phase of the molding cycle if the information from the first electronic flow sensor indicates that the piston is in a position in which a molding nozzle is closed.

6. The injection molding system according to the preceding claim 5, wherein the controller is configured to dynamically adjust the flow control valve in the injection phase, after determining the beginning of the injection phase, controlling thereby a position and the speed of the change of the position of the first piston drive and thus the molding nozzle.

7. The injection molding system according to the preceding claim 6, wherein the controller is configured to allow an interactive reprogramming of the dynamical adjustment of the flow control valve.

8. The injection molding system according to claim 1, wherein a second flow control valve is located in the second pressure line.

9. The injection molding system according to claim 1, comprising several first actuator systems, and their respective electronic flow sensors and their respective flow control valves are connected to the controller and the controller, which is configured to control one or more of the respective flow control valves based on one or more of the information of the respective electronic flow sensors.

10. The injection molding system according to claim 1, wherein after receiving information from the first electronic flow sensor, that a threshold has been passed, the adjustable flow control valve is opened or closed to a predefined throttle level and/or flow by the controller.

11. The injection molding system according to the previous claim 10, wherein a check valve is connected in parallel to the adjustable flow control valve, providing a by-pass, when extending or retracting the piston of the first piston drive.

12. The injection molding system according to claim 1, wherein the controller is configured to calculate based on the information of the first electronic flow sensor the position of the piston of the piston drive.

13. The injection molding system according to claim 1, wherein the controller is configured to calculate the viscosity of a pressure fluid in any of the first, second or third pressure lines based on the information of the first electronic flow sensor and to compensate a deviation of the viscosity from a predefined value by adjusting the electronically adjustable flow control valve.

14. Injection molding system comprising:
at least one first actuator-system, the first actuator system comprising:
at least one piston drive having at least two pressure line connectors to drive a piston to open or close a molding nozzle;
pressure lines connectable to a changeover valve having a pressure line connector and tank line connector and at least two changeover pressure line connectors, wherein the first changeover valve pressure line connector is connectable to a first pressure line and the second changeover valve pressure line connector is connectable to a second pressure line, wherein the second pressure line is connected to the second pressure line connector of the piston drive;
an electronically adjustable flow control valve having a first pressure line connector and a second pressure line connector, wherein the first pressure line connector of the adjustable flow control valve being connected to the first pressure line to allow a connection to the first pressure line connector of the changeover valve, and the second pressure line connector is connected to a third pressure line which establishes a connection to the second pressure lien line connector of the piston drive;
at least one electronic flow sensor for sensing flow rate in the first, second and/or third pressure lines;
a controller connected to the adjustable flow control valve and to the at least one electronic flow sensor, configured to electronically adjust the flow control valve, depending on information of the at least one electronic flow sensor, controlling thereby the timing and the speed of the movement of the piston and the molding nozzle; and
further comprising several first actuator systems, and their respective sensors and their respective flow control valves are connected to the controller and the controller, which is configured to control one or more of the flow control valves based on one or more of the information of the sensors and wherein the several actuator systems are configured to be controlled in a cascade, and wherein the flow control valves of one actuator system is also configured to be controlled by the information of the at least one sensor of a different actuator system.

15. The injection molding system according to claim 14, wherein a first flow sensor is adapted to measure the flow rate in the first pressure line between the adjustable flow control valve and the changeover valve, and/or wherein a second flow sensor is adapted to measure the flow in the second pressure line between the piston drive and the changeover valve and/or wherein a third flow sensor is adapted to measure the flow in the third pressure line between the piston drive and the adjustable flow control valve.

16. The injection molding system according to claim 14, wherein a first pressure sensor adapted to measure the pressure in the first pressure line between the adjustable flow control valve and the changeover valve, and/or wherein additionally a second pressure sensor is adapted to measure the pressure in the second pressure line between the piston drive and the changeover valve and/or wherein a third pressure sensor is adapted to measure the pressure in the third pressure line between the piston drive and the adjustable flow control valve.

17. The injection molding system according to claim 14, wherein the controller is configured to determine a beginning and/or an end of the injection phase of a molding cycle based on information of the at least one sensor, and to adjust the flow control valve, in an initial and/or final cycle position and wherein the controller is configured to determine the end of the injection phase of the molding cycle if the information from the at least one sensor indicate that the piston is in a position in which a molding nozzle is closed, for a predefined timespan, and wherein the controller is configured to dynamically adjust the flow control valve in the injection phase, after determining the beginning of the injection phase, controlling thereby a position and the speed of the change of the position of the piston and thus the molding nozzle, wherein also information of at least one timer and/or volume quantity information are used to determine the point of time and/or the position of the piston the speed of the dynamical adjustment of the flow control valve, and wherein the controller is configured to allow an interactive reprogramming of the dynamical adjustment of the flow control valve.

18. The injection molding system according to claim 14, wherein a second flow control valve is located in the second pressure line.

19. The injection molding system according to claim 14, additionally comprising a second actuator system, comprising:
said second actuator system including:
a second piston drive having at least two pressure line connectors to drive a second piston drive to open or close a molding nozzle;
second pressure lines connectable to one or more changeover valves having a pressure line connector and tank line connector and at least two changeover pressure line connectors, wherein the first changeover valve pressure line connector is connectable to a first pressure line and the second changeover valve pressure line connector is connectable to a second pressure line, wherein the second pressure line is connected to the connector of the piston drive, and wherein the first pressure line is connected to the second connector of the piston drive;
a second electronic flow sensor for detecting the flow rate in the first and second pressure line;
the controller is connected additionally to the second electronic flow sensor to allow adjustment of the flow control valve based on information of the second electronic flow sensor.

20. The injection molding system according to claim 14, wherein the several actuator systems are configured to be controllable in a cascade.

21. The injection molding system according to claim 14, wherein after receiving information from the at least one sensor, that a threshold has been passed, the adjustable flow control valve is opened or closed to a predefined throttle level/flow level by the controller.

22. The injection molding system according to claim 14, wherein the controller is configured to calculate based on the information of the at least one flow sensor the position of the piston of the piston drive, preferably based on the information of the third flow sensor over a defined time interval, and preferably wherein a check valve is connected in parallel to the adjustable flow control valve, providing a by-pass, when extending or retracting the piston of the piston drive.

23. The injection molding system according to claim 14, wherein the controller is configured to calculate the viscosity of a pressure fluid in the pressure line based on the information of the at least one flow sensor and to compensate a deviation of the viscosity from a predefined value by adjusting one or more of the flow control valve(s).

* * * * *